United States Patent
Norikura

(10) Patent No.: US 6,494,071 B2
(45) Date of Patent: Dec. 17, 2002

(54) ROLLING MILL FACILITY WITH STRIP SHAPE DETECTION EQUIPMENT, STRIP SHAPE DETECTION DEVICE, STRIP SHAPE DETECTION METHOD AND ROLLING METHOD

(75) Inventor: Takashi Norikura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/791,751

(22) Filed: Feb. 26, 2001

(65) Prior Publication Data

US 2002/0014099 A1 Feb. 7, 2002

(30) Foreign Application Priority Data

Aug. 7, 2000 (JP) ........................................ 2000-238136

(51) Int. Cl.⁷ ................................................ B21B 37/68
(52) U.S. Cl. .............................. 72/12.7; 72/8.9; 72/9.1; 72/11.6
(58) Field of Search .............................. 72/8.3, 8.9, 9.1, 72/11.1, 11.6, 11.7, 12.7; 73/862.07, 862.451, 862.471, 862.472

(56) References Cited

U.S. PATENT DOCUMENTS 4,512,170 A * 4/1985 Hsu ............................ 72/11.7
4,633,693 A * 1/1987 Tahara et al. ................. 72/9.1
4,860,212 A * 8/1989 Uesugi ........................ 72/11.7

FOREIGN PATENT DOCUMENTS

| JP | 60-238013 | * 11/1985 | .................. 72/9.1 |
| JP | 2000-238136 | 9/2000 | |

OTHER PUBLICATIONS

"The Manufacturing of the narrow strip steel by cold rolling" published in Jun., 1995; with an English translation.
"Theory and Practice of Rolling" published by The Iron and Steel Institute of Japan, pp. 269–270.

* cited by examiner

*Primary Examiner*—Ed Tolan
(74) *Attorney, Agent, or Firm*—Crowell & Moring LLP

(57) ABSTRACT

A rolling mill facility includes a single or plural rolling mills having a pair of top and bottom work rolls and that roll strip steel and strip shape detecting devices installed at least on one side of the inlet and outlet sides of the rolling mill. The strip shape detecting devices consist of a single roller on which the metal strip gets wound and at least two bearing boxes one side or four bearing boxes on both sides with the bearing boxes supporting the roller in a free-to-rotate manner and at least two load cells on one side or four load cells on both sides for measuring the supporting load of each of the bearing boxes. From the load values measured by the load cells, the tension distribution of the strip is computed and that tension distribution is converted into the strip shape of the strip.

7 Claims, 12 Drawing Sheets

FIG. 4
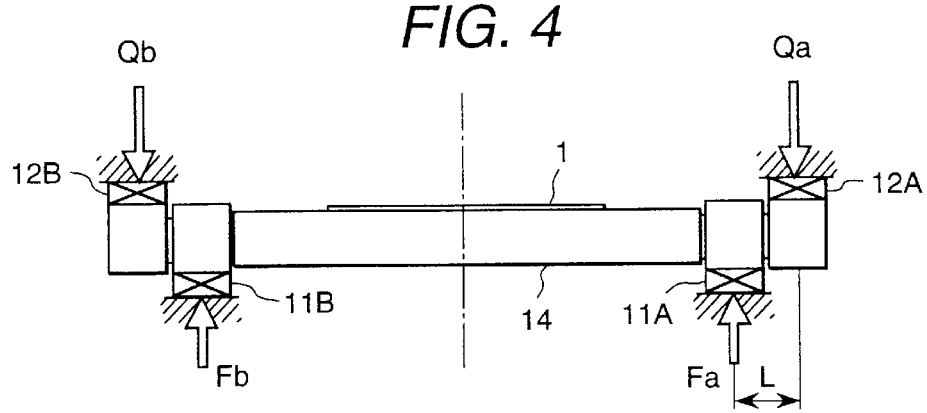
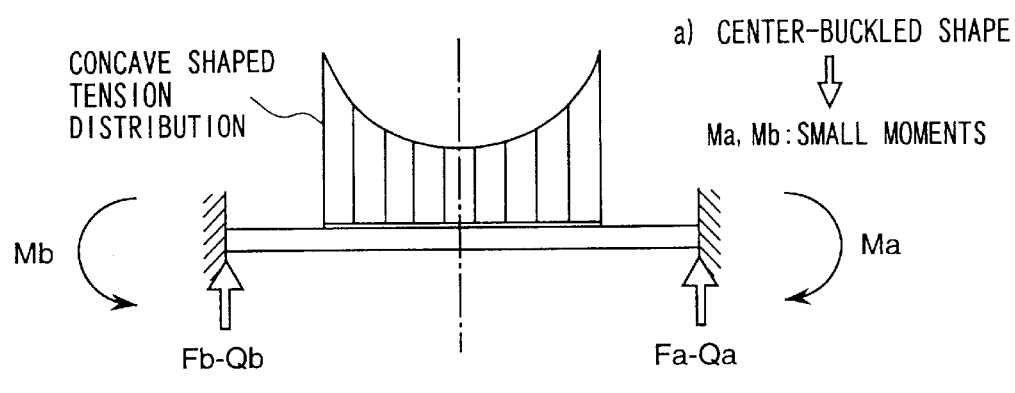
a) CENTER-BUCKLED SHAPE
⇩
Ma, Mb: SMALL MOMENTS
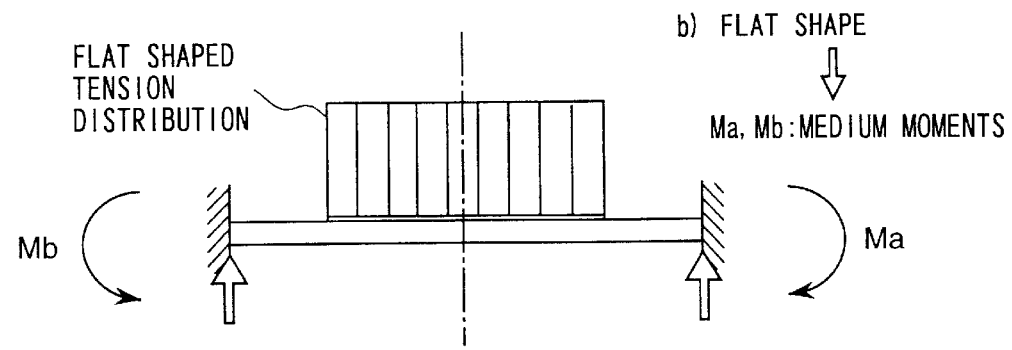
b) FLAT SHAPE
⇩
Ma, Mb: MEDIUM MOMENTS
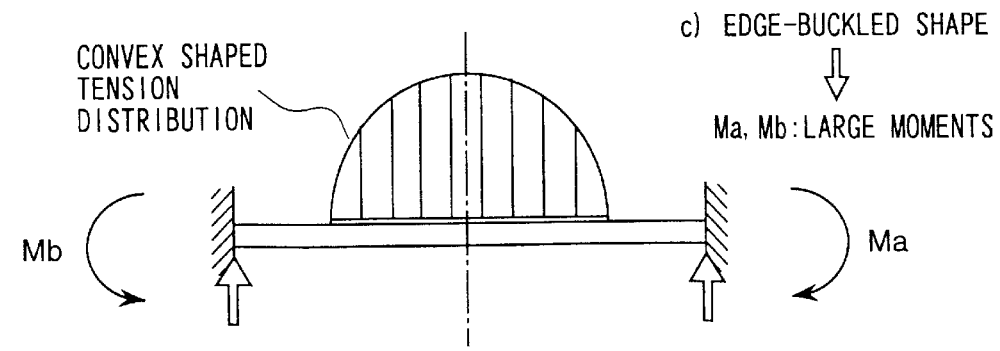
c) EDGE-BUCKLED SHAPE
⇩
Ma, Mb: LARGE MOMENTS FIG. 5
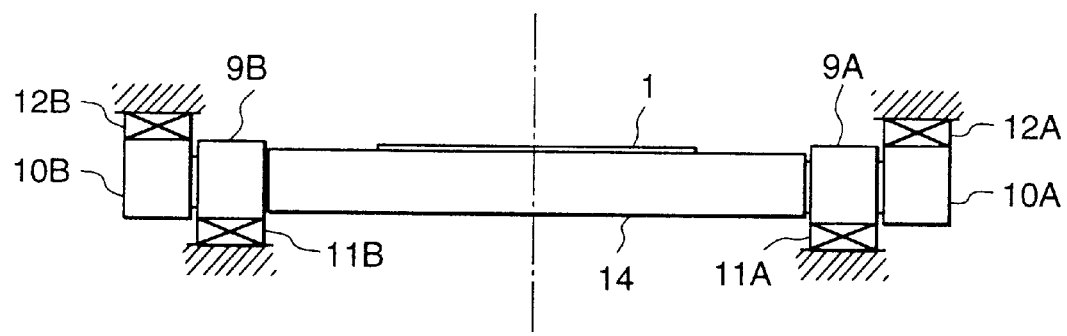
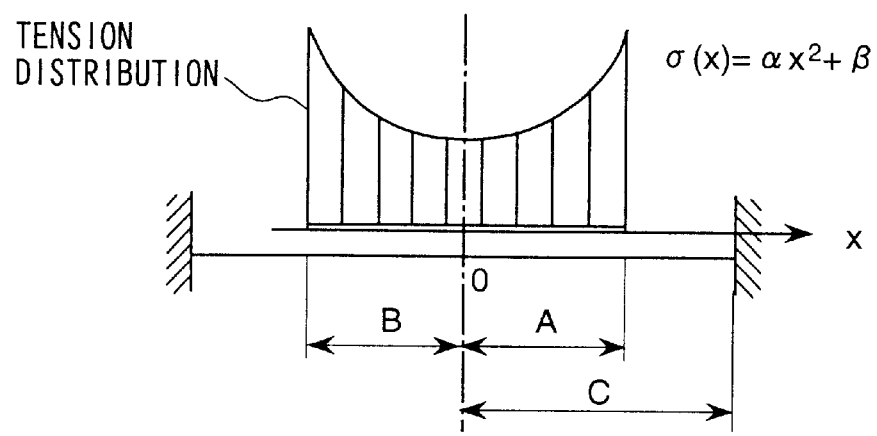
$\sigma(x) = \alpha x^2 + \beta$
TENSION DISTRIBUTION

FIG. 9
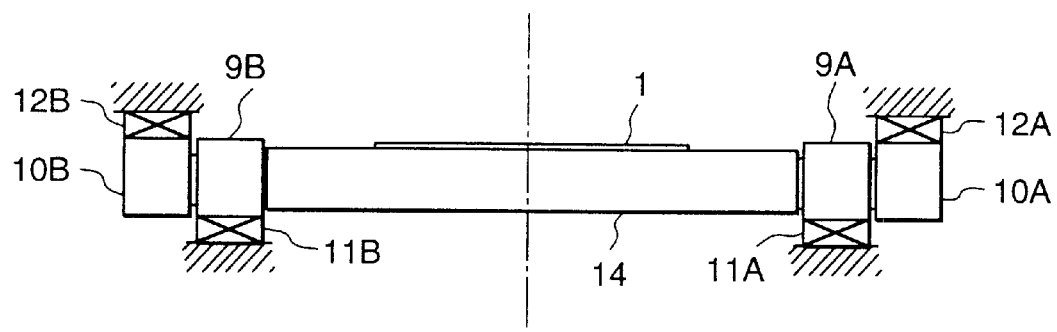
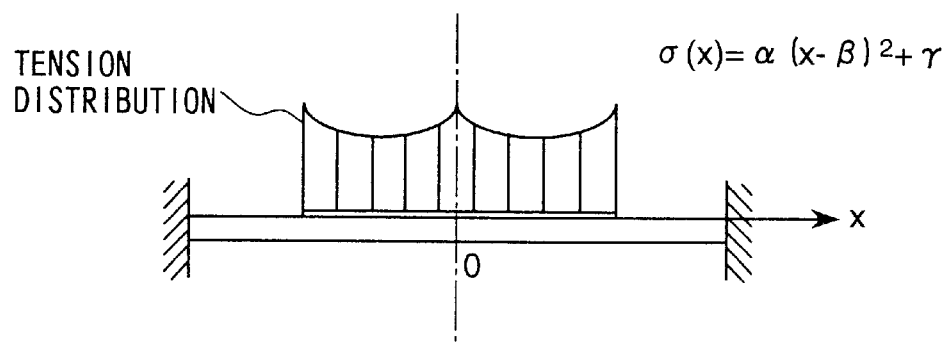
TENSION DISTRIBUTION
$\sigma(x) = \alpha(x-\beta)^2 + \gamma$

ROLLING MILL FACILITY WITH STRIP SHAPE DETECTION EQUIPMENT, STRIP SHAPE DETECTION DEVICE, STRIP SHAPE DETECTION METHOD AND ROLLING METHOD

BACKGROUND OF THE INVENTION

1. Field of Utilization in Industry

The present invention relates to rolling mill facilities having strip shape detection equipment, and in particular to, a rolling mill facility that has strip shape detection equipment having strip shape detecting devices installed at least on one of the inlet side and the outlet side of the rolling mill that rolls metal strips, permitting the measurement of the strip shape using such shape detected equipment, having a high productivity, and being ideally suitable for obtaining strips with excellent strip shape.

2. Prior Art

Conventionally, as has been described in pages 269–270 of "Theory and Practice of Rolling" published by The Iron and Steel Institute of Japan, the most widely used type is the segmented roller type in which shape detecting devices are installed in the shape detection equipment for measuring the strip shape after rolling the metal strip s, and the body part of the detection roller is segmented with a pitch of about 50 mm, the weight load on each of those rings is measured, and from them, the tension distribution is calculated, and from that tension distribution conversion is made to the strip shape of the strip thereby measuring strip shape of the strip. The accuracy in such segmented roller types will be high because they allow measurement of the direct tension distribution for each segment ring.

However, the following problems are present in said conventional technologies.

That is, since the strip shape detecting device of the conventional segmented roller type divides the body part of the rotating sensor roller into several segments and has a complicated construction in which different load cells are incorporated for each segment, although the detection accuracy is good, the device becomes extremely expensive. In addition, because of being of the segmented roller type, there is the fear of scratching the surface of the strip in each segment and of bad effects of thermal deformation due to heat transfer from the strip.

SUMMARY OF THE INVENTION

An object of the present invention is to provide a rolling mill facility having a strip shape detection equipment with a simple construction, and using which it is possible to measure easily the strip shape of the metal strip after rolling.

The rolling mill facility having strip shape detection equipment according to the present invention adopts the following construction in order to achieve the above object.

(1) Firstly, in the present invention, the rolling mill facility comprises at least one rolling mill having a pair of top and bottom work rolls that roll the strips, and a strip shape detection equipment in which a shape detecting device is installed at least on one of the inlet and outlet sides of the rolling mill, and the strip shape detecting device comprises one roller on which the metal strip is wound, at least two bearing boxes on one side and four bearing boxes on both sides provided on an operating side end section and a driving side end section, respectively, of that roller, and supporting the roller in a free-to-rotate manner, and at least two load cells on one side or four load cells on both sides, with the load cells being provided on the bearing boxes, respectively, and capable of measuring the supporting load on each of the bearing boxes.

By constructing such a strip shape detecting device with one roller, two bearing boxes on one side or four bearing boxes on both sides, and two load cells on one side or four load cells on both sides, the tension distribution of the strip can be calculated from the load values measured by the load cells, that tension distribution can be converted into the strip shape of the strip, thus indirectly measuring the strip shape of the strip, and hence it becomes possible to measure easily the strip shape of the metal strip after rolling with a simple construction.

In addition, since the roller is a non-segmented integrated construction roller, there is no problem of causing scratches on the surface of the strip, and also there are no bad effects of thermal deformation due to heat transfer from the strip, and hence the durability gets improved.

(2) In (1) above, preferably, the strip shape detection equipment is additionally provided with a means for calculating the tension distribution of the strip from the load values measured by the load cells of the strip shape detecting device, and for converting that tension distribution into the strip shape of the strip Because of this, it is possible to carry out automatically and instantaneously the calculation of the strip shape after measuring the load values.

(3) Further, in (2) above, preferably, the means for calculating the strip shape of the strip converts to the strip shape of the operation side half of the strip from the load measured by the two load cells provided in the bearing boxes on the operation side end section of the strip shape detector, and converts to the strip shape of the driving side half of the strip from the load measured by the two load cells provided in the bearing boxes on the driving side end section of the strip shape detector.

Because of this, it is possible to calculate the entire strip shape.

(4) Further, in (1) above, preferably, the strip shape detecting devices respectively on the two bearing boxes on each side are provided additionally with a means on any one bearing box out of the two bearing boxes on each side for applying pre-load on the bearing box in the direction of the supporting load.

Because of this, since it becomes possible to kill the gap between the bearing box and the load cell, it will be possible to measure the load using load cells with a good accuracy.

(5) In (1) above, preferably, said shape detection equipment is additionally provided with an edge position detecting device that detects the amount of meandering movement of the strip, and a means that not only calculates the operating side plate width range and the driving side plate width range according to the detected value from that edge position detecting device, but also converts to the strip shape of the plate width range of the strip on the operation side from the load measured by the two load cells provided on the bearing boxes in the operation side end section of said shape detecting device, and converts to the strip shape of the plate width range of the strip on the driving side from the load measured by the two load cells provided on the bearing boxes in the driving side end section of said shape detecting device.

Because of this, even when there is meandering movement of the plate, it will be possible to detect the shape by compensating for that meandering movement.

(6) In (1) above, preferably, the strip shape detection equipment is additionally provided with a displacement measurement means that measures the roller surface displacement in the tension supporting direction at at least one location of the roller of the strip shape detecting device, and a means for calculating the tension distribution of the strip from the load measured by the load cells of the strip shape detecting device and the values measured by the displacement measurement means, and converts that tension distribution into the strip shape of the strip.

Because of this, it will be possible to detect shapes of compound buckle in addition to center buckle and edge buckle shapes.

(7) In (1) above, preferably, the rolling mill facility is provided with a control means that carries out feedback control of the strip shape controlling means of the rolling mill so that the difference between the shape measured by the strip shape detecting device on the outlet side of the rolling mill equipment and the previously set target strip shape becomes small.

Because of this, it will be possible to increase the acceleration rate at the time of starting the rolling operation, and also to increase the production efficiency because the frequency of strip exhaustion gets decreased.

(8) Further, in the present invention, the rolling mill facility comprises at least one rolling mill having a pair of top and bottom work rolls that roll the strips, and a strip shape detection equipment in which a shape detecting device is installed at least on one of the inlet and outlet sides of the rolling mill, the strip shape detecting device comprises one roller on which the metal strip is wound, and at least two bearing boxes on one side and four bearing boxes on both sides provided on an operating side end section and the driving side end section, respectively, of that roller, and supporting the roller in a free-to-rotate manner, and the strip shape detection equipment measures the supporting load on the bearing boxes of the strip shape detecting devices and the supporting moment, calculates the tension distribution of the strip from these measured values, and converts that tension distribution into the strip shape of the strip.

Because of this, it will be possible to calculate the tension distribution of the strip, to convert that tension distribution into the strip shape of the strip, thus indirectly measuring the strip shape of the strip, and hence to measure easily the strip shape of the metal strip after rolling with a simple construction.

In addition, since the roller is a non-segmented integrated construction roller, there is no problem of causing scratches on the surface of the strip, and also there are no bad effects of thermal deformation due to heat transfer from the strip, and hence the durability gets improved.

(9) Further, in the present invention, the rolling mill facility comprises at least one rolling mill having a pair of top and bottom work rolls that roll the strips, and a strip shape detection equipment in which a strip shape detecting device is installed at least on one of the inlet and outlet sides of the rolling mill, the strip shape detecting device comprises one roller on which the metal strip is wound, and at least one bearing box on one side and two bearing boxes on both sides, provided on the operating side end section and the driving side end section, respectively, of that roller, and supporting the roller in a free-to-rotate manner, and the strip shape detection equipment approximates the tension distribution of the strip using a function in the plate width direction and having several unknown coefficients, and measures the same number of parameters as the number of unknown coefficients among the parameters of the supporting load on the bearing boxes, the supporting moment on the bearing boxes, the deflection of the roller, the deflection angle of the roller, and/or the roller bending stress, and prepares condition equations equal in number to the number of the unknown coefficients from these measured values, computes the unknown coefficients and calculates the strip tension distribution, and converts that tension distribution into the strip shape of the strip.

Because of this, it will be possible to calculate the tension distribution of the strip, to convert that tension distribution into the strip shape of the strip, thus indirectly measuring the strip shape of the strip, and hence to measure easily the strip shape of the metal strip after rolling with a simple construction.

In addition, since the roller is a non-segmented integrated construction roller, there is no problem of causing scratches on the surface of the strip, and also there are no bad effects of thermal deformation due to heat transfer from the strip, and hence the durability gets improved.

BRIEF DESCRIPTION OF DRAWINGS

FIG. 4 is a view explaining the relationship between the strip tension distribution and the supporting reaction force and supporting moment at the roller supporting point;

FIG. 5 is a view explaining the approximation equation of the strip tension distribution;

FIG. 9 is a view explaining the approximation equation of the strip tension distribution.

PREFERRED EMBODIMENTS OF THE INVENTION

Figure 1:
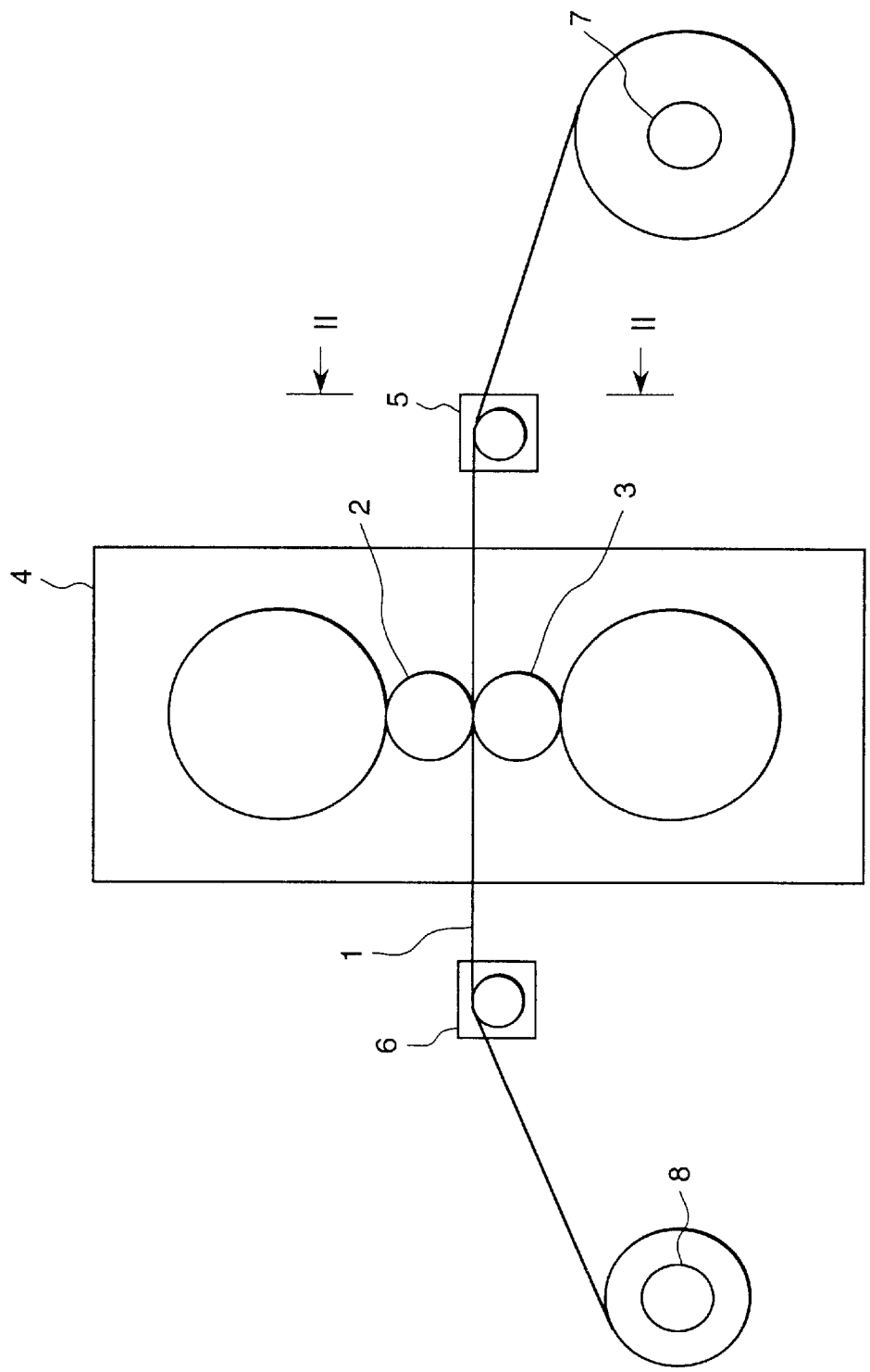
FIG. 1 is a front view of a rolling mill facility with shape detection equipment according to the first preferred embodiment of the present invention.

In the following, several preferred embodiments of the present invention are described referring to the drawings.

To begin with, the first preferred embodiment of the present invention is described below referring to FIG. 1 to FIG. 5.

In FIG. 1, the rolling mill facility comprising a strip shape detection equipment according to this first preferred embodiment of the present invention, comprises a rolling mill 4 having a pair of top and bottom work rolls 2 and 3 that roll the strip 1 and the take-up and supply rolls 7 and 8 placed on the inlet and outlet sides of this rolling mill 4. The rolling mill 4 is a reversible mill, in that, for example, the strip 1 which is the material taken out from the take-up/supply roll 7 for rolling is rolled by the work rolls 2 and 3 of the rolling mill 4, and is then taken up by the take-up/supply roll 8. The shape detecting devices 5 and 6 have been installed between the take-up/supply rolls 7 and 8 on the inlet and outlet sides of the rolling mill 4. The shape detecting devices 5 and 6 constitute the shape detection equipment that is related to the present preferred embodiment of the invention, and both of these devices have the same construction.

Figure 2:
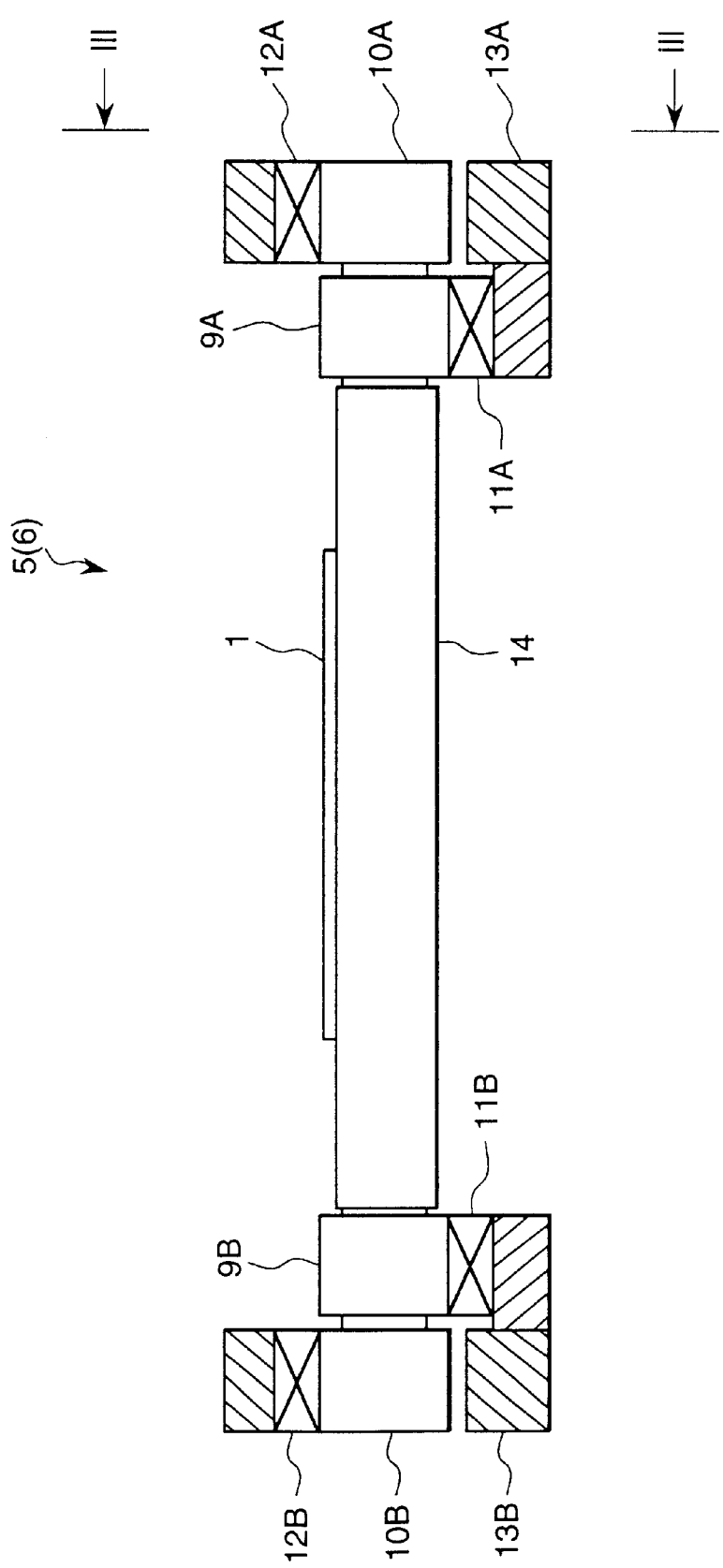
FIG. 2 is a sectional view along the II—II line in FIG. 1.
Figure 3:
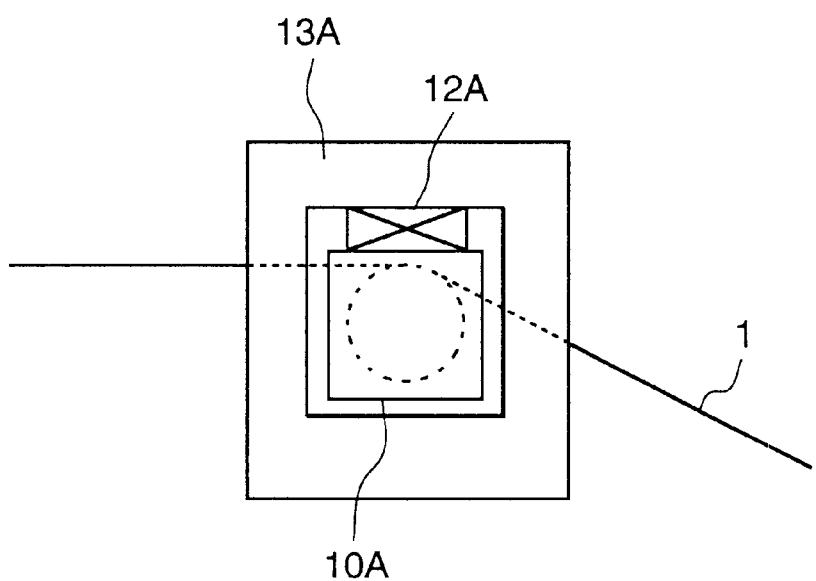
FIG. 3 is a sectional view along the III—III line in FIG. 2.

The details of the shape detecting device 5 are shown in FIG. 2 and FIG. 3. The shape detecting device 5 is provided with one roller 14 that is partially wound around (by a specific angle) by the strip 1, two bearing boxes on one side with a total of four bearing boxes on both sides 9A, 10A, 9B, 10B of the operating side end section and the driving side end section, respectively, of that roller 14, with these bearing boxes containing bearings (not shown in the figure) that support the roller in a free-to-rotate manner, and load cells 11A, 12A, 11B, 12B that are provided on the load surfaces of these bearing boxes 9A, 10A, 9B, 10B with two load cells on one side or four load cells on two sides that measure the supporting load of each bearing, and the frames 13A and 13B that support these load cells 11A, 12A, 11B, 12B.

Here, the load cells 11A and 11B support the bottom surfaces of the inside bearing boxes 9A and 9B taking them as the load surfaces and are supported by the frames 13A and 13B, while the load cells 12A and 12B support the top surfaces of the outside bearing boxes 10A and 10B taking them as the load surfaces and are supported by the frames 13A and 13B on the upper side, and the load cells 11A, 12A, 11B, and 12B as well as the frames 13A and 13B function as the fixed fulcrum supporting the two ends of the roller 14.

The shape detection method using the shape detecting devices 5 and 6 is described below.

In FIG. 4, the strip 1 contacts the roller 14 for a specific angle, and tensile force of strip 1 acts on the roller 14. At this time, since the load cells 11A, 12A, 11B, and 12B and the frames 13A and 13B function as the fixed fulcrum supporting the two ends of the roller 14 as mentioned above, the supporting reaction forces Fa and Fb of the inside load cells 11A and 11B and the frames 13A and 13B act in the upward direction on the two ends of the roller 14, and the supporting reaction forces Qa and Qb of the outside load cells 12A and 12B and the frames 13A and 13B act in the downward direction. These supporting reaction forces Fa, Fb, Qa, and Qb are respectively detected as the vertical loads by the load cells 11A, 11B, 12A, and 12B.

Further, the supporting moment Ma due to the load cells 11A and 12A and the frame 13A and the supporting moment Mb due to the load cells 11B and 12B and the frame 13B act on the two ends of the roller 14, and if the spacing between the load cells 11A and 12A and between the load cells 11B and 12B is taken as L, the respective supporting moments are given by the following equations:

$$Ma = L \cdot (Fa - Qa)$$

$$Mb = L \cdot (Fb - Qb)$$

The tension distribution of the strip 1 is balanced with the supporting reaction forces Fa and Fb and the supporting moments Ma and Mb due to beam balancing.

Conceptually, when the supporting reaction forces Fa and Fb have the same value and the strip 1 has the center buckled shape as shown in FIG. 4(a), the tension distribution has a low value at the center of the plate and high values at the edges, thus having a concave distribution. When the strip 1 has a flat shape as shown in FIG. 4(b), the tension distribution will be a flat distribution. In this case, the supporting moments Ma and Mb that are calculated from the measured supporting reaction forces Fa, Fb, Qa, and Qb will have intermediate values. When the strip 1 has an edge buckled shape as shown in FIG. 4(c), the tension distribution has a high value at the center of the plate and low values at the edges, thus having a convex distribution. In this case, the supporting moments Ma and Mb that are calculated from the measured supporting reaction forces Fa, Fb, Qa, and Qb will have large values.

At the time of calculating the strip shape, for example, as shown in FIG. 5, the tension distribution is approximated by a second order equation $\sigma(x) = \alpha \cdot x^2 + \beta$. In this case, the tension distribution is divided into the left and right parts at the mid-point of the roller 14, and the tension distributions on these sides are approximated respectively by the second order equations $\sigma(x) = \alpha a \cdot x^2 + \beta a$ (the right half part in the figure) and $\sigma(x) = \alpha b \cdot x^2 + \beta b$ (the left half part in the figure). The unknown coefficients to be obtained are two on each side and four in all, and are the coefficients $\alpha a$, $\beta a$, $\alpha b$, and $\beta b$. The two unknown coefficients on each side are obtained from the two simultaneous equations of the vertical direction force balancing equation and the condition equation of the beam deflection angle 0 of the fixed fulcrum section. Here, equation of vertical direction force balancing is the equation of balance between the vertical load based on the tension distribution calculated from $\sigma(x) = \alpha a \cdot x^2 + \beta a$ (the right half part in the figure) or $\sigma(x) = \alpha b \cdot x^2 + \beta b$ (the left half part in the figure) and the supporting reaction forces Fa, Fb, Qa, and Qb, and the condition equation of the beam deflection angle 0 of the fixed fulcrum section equation of balance between the supporting moment calculated from vertical load of the tension distribution and the supporting moment Ma.

The results of calculations are given below. This calculation is obtained from the tension distribution of the right half part shown in FIG. 5.

$$\alpha a = (15 Fa \cdot (3C^2 - A^2) - 90 C \cdot Ma)/(4A^5) \qquad (1)$$

$$\beta a = (Fa \cdot (27A^2 - 45C^2) - 90 C \cdot Ma)/(12A^3) \qquad (2)$$

In other words, by measuring the fulcrum reaction forces Fa and Qa and calculating the supporting moment Ma, the unknown coefficients $\alpha a$ and $\beta a$ can be obtained from the above equations thereby calculating the tension distribution. In a similar manner, even for the left half part in FIG. 5, by measuring the fulcrum reaction forces Fb and Qb and calculating the supporting moment Mb, the unknown coefficients $\alpha b$ and $\beta b$ can be obtained from the above equations thereby calculating the tension distribution.

Further, the conversion to shape from the tension distribution is made using the following equation. Here, $\Delta\sigma(x)$ is the deviation from the minimum value of the tension distribution, and E is the elastic constant of the strip.

$$\text{Strip shape (I-unit)} = (\Delta\sigma(x) \cdot 10^5)/E \qquad (3)$$

According to the present preferred embodiment of the invention, it is possible to detect the center-buckled and edge-buckled shapes equivalent to the tension distributions shown in FIG. 5 using shape detecting devices 5 and 6 that have a simple construction.

In addition, since the roller is a non-segmented integrated construction roller, there is no problem of causing scratches on the surface of the strip, and also there are no bad effects of thermal deformation due to heat transfer from the strip, and hence the durability gets improved.

Figure 6:
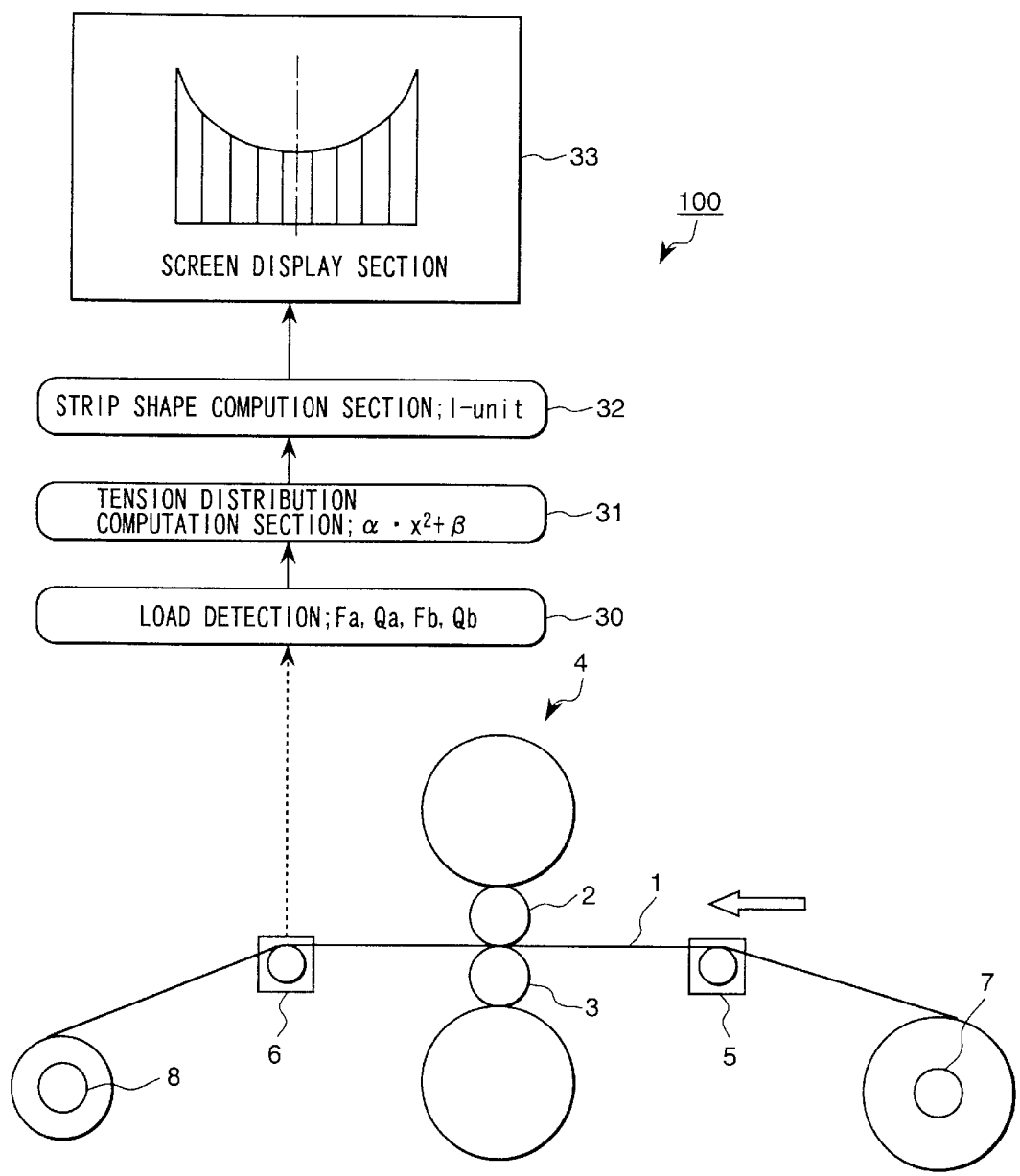
FIG. 6 is a view showing the rolling mill facility with strip shape detection equipment according to the second preferred embodiment of the present invention using some functional blocks.

A second preferred embodiment of the present invention is shown in FIG. 6. In this preferred embodiment, the process of calculating the shape from the load detected by the shape detecting devices 5 and 6 is carried out by a computer.

In FIG. 6, the shape detection equipment pertaining to the present preferred embodiment has, in addition to the shape detecting devices 5 and 6, a computer 100 having a load detection section 30, a tension distribution computation section 31, a strip shape computation section 32, and a screen display section 33.

The load detection section 30 receives the input of the detection signals from the shape detecting devices 5 and 6 and computes the supporting reaction forces Fa, Fb, Qa, and Qb.

The tension distribution computation section 31 computes the unknown coefficients $\alpha a$, $\beta a$, $\alpha b$, and $\beta b$ from the supporting reaction forces obtained in the load detection section 30 using the above equations (1) and (2), and obtains the tension distribution approximation functions $\sigma(x)=\alpha a \cdot x^2 + \beta b$ and $\sigma(x)=\alpha b \cdot x^2 + \beta b$.

The strip shape computation section 32 computes the strip shape I-unit using the above equation (3) from the tension distribution approximation functions $\sigma(x)=\alpha a \cdot x^2 + \beta a$ and $\sigma(x)=\alpha b \cdot x^2 = \beta b$ obtained in the tension distribution computation section 31.

The screen display section 33 displays the strip shape compute d in the strip shape computation section 32.

According to the present preferred embodiment of the invention, it is possible to carry out automatically and instantaneously the detection and calculation of the center-buckled and edge-buckled strip shapes corresponding to the tension distributions in FIG. 5.

Figure 7:
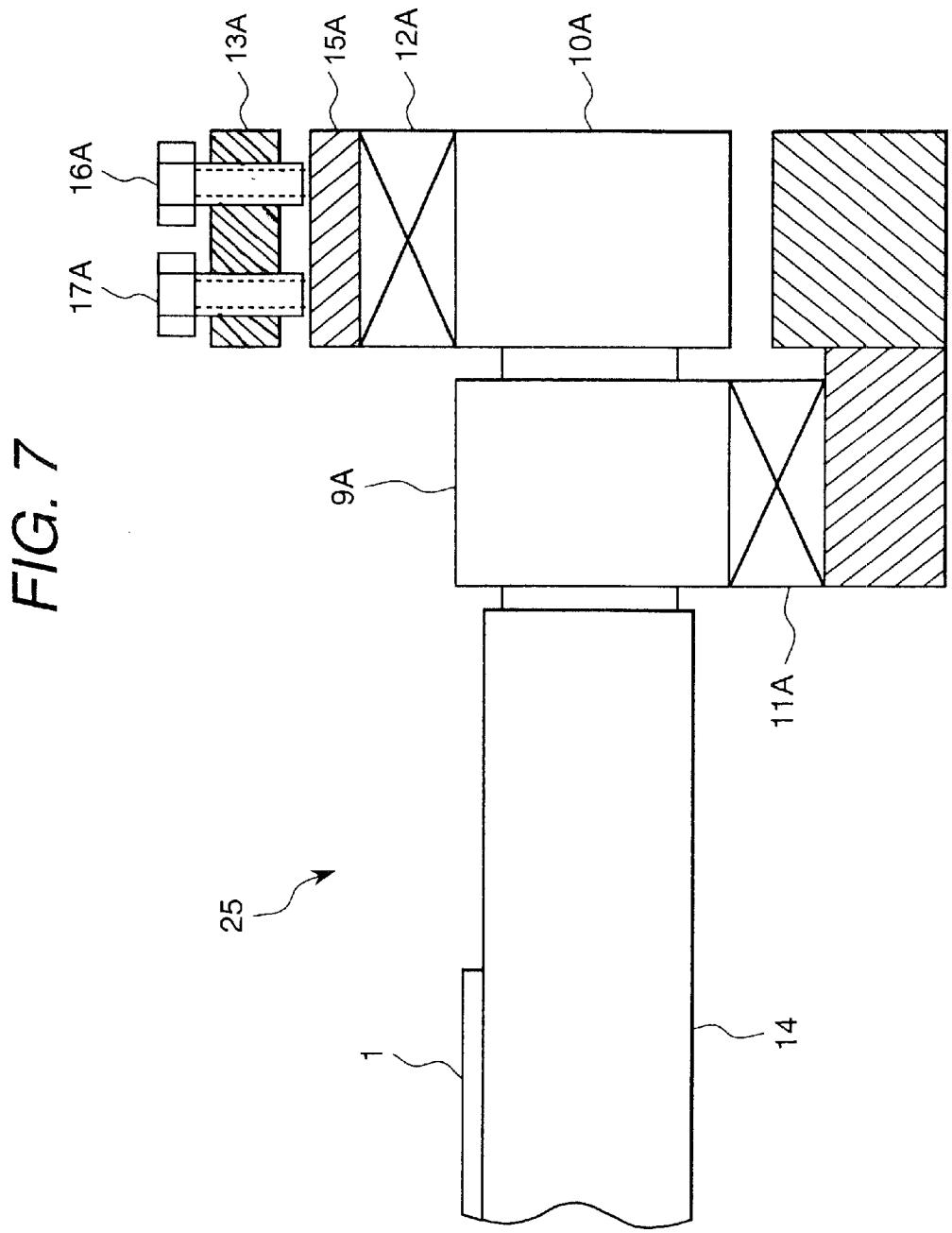
FIG. 7 is a side view of the important sections of the strip shape detection equipment according to the third preferred embodiment of the present invention.

A third preferred embodiment of the present invention is shown in FIG. 7. This preferred embodiment is one in which the play in the supporting section is eliminated.

In FIG. 7, the shape detection equipment pertaining to the present preferred embodiment has a shape detecting device 25, and this shape detecting device 25 has the frame 13A supporting the load cells 11A and 11B in the operation side end section of the roller 14, bolts 16A and 17A that are linked to the frame 13A by screws, and a plate 15A that is pushed against the load cell 12A by these bolts 16A and 17A, and by tightening the bolts 16A and 17A, a pre-load is applied in the supporting load direction to the load cell 12A via the plate 15A. Even the driving side end section of the roller 14 in the shape detecting device 25 has a similar construction. Further, the shape detecting device 25 corresponds to the shape detecting device 5 in the first preferred embodiment of the present invention, and it is also possible to construct an equivalent of the shape detecting device 6 in a similar manner.

According to this preferred embodiment, since the gaps of the bearing boxes 9A and 10A, the load cells 11A and 12A, and the frame 13A can be made zero, it is possible to measure the load with a high accuracy from the load cells 11a and 12A.

A fourth preferred embodiment of the present invention is described below using FIG. 8 and FIG. 9.

Figure 8:
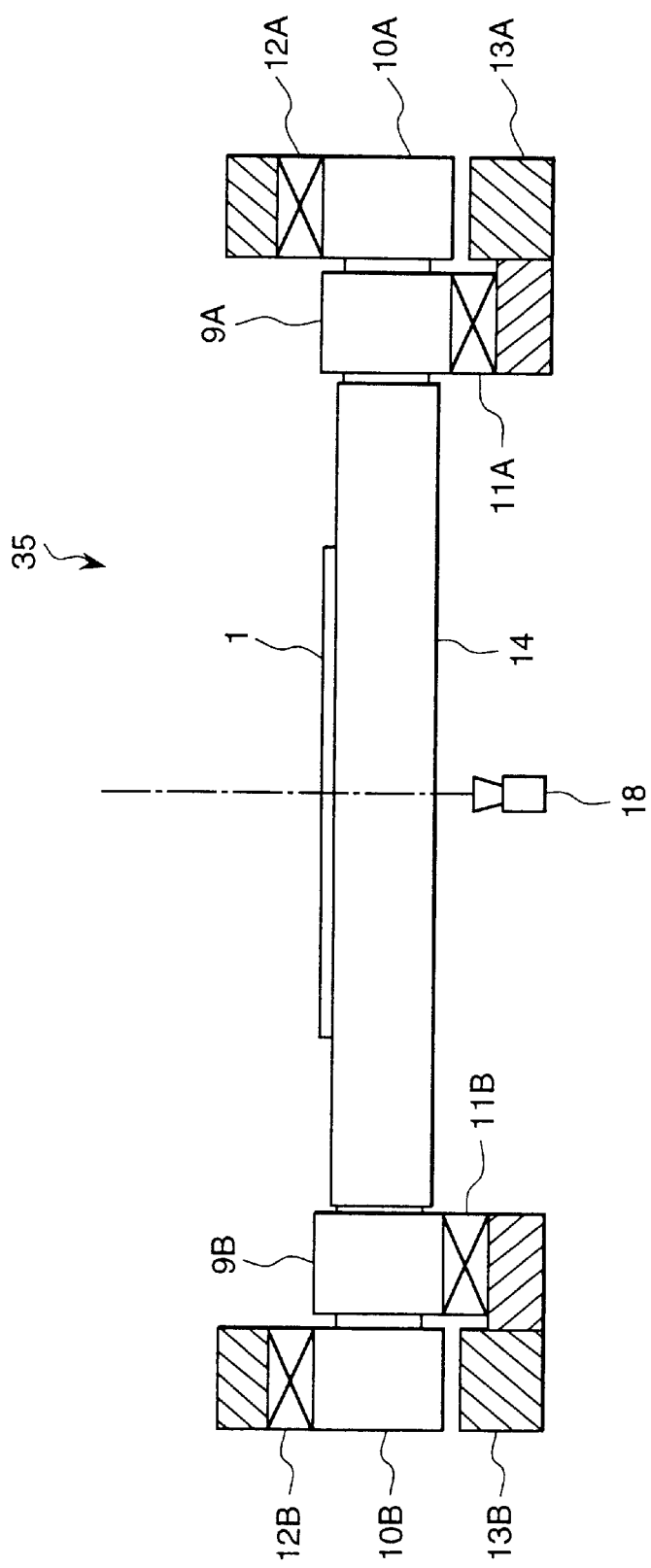
FIG. 8 is a side view of the shape detection equipment according to the fourth preferred embodiment of the present invention similar to FIG. 2.

In FIG. 8, the shape detection equipment pertaining to the present preferred embodiment has a shape detecting device 35, and this shape detecting device 35 has a gap sensor 18 provided on the lower side of the mid-point of the roller 14, and the deflection of the mid-point of the roller 14 is detected by this gap sensor 18.

In the present preferred embodiment, as shown in FIG. 9, the tension distribution is approximated by the second order function $\sigma(x)=\alpha \cdot (x-\beta)^2+\gamma$, and in this case, the unknown coefficients to be obtained are $\alpha$, $\beta$, and $\gamma$ on each of the left and right sides with a total of 6 coefficients. The three unknown coefficients on each side are obtained using total of three simultaneous equations consisting of the equation for calculating the deflection of the-mid-point of the roller 14 in addition to the vertical direction force balancing equation and the condition equation of the beam deflection angle 0 of the fixed fulcrum section. In other words, for the right half part shown in FIG. 9, the values of the coefficients $\alpha$, $\beta$, and $\gamma$ are obtained by measuring the supporting reaction forces Fa and Qa, calculating the supporting moment Ma, and also measuring the amount of deflection of the mid-point of the roller, after which the tension distribution is calculated. In a similar manner, for the left half part also, Fb and Qb are measured, the supporting moment Mb is calculated, and also the amount of deflection of the mid-point of the roller is measured, and then the tension distribution is calculated.

According to the present preferred embodiment of the invention, it is possible to detect compound buckling shapes in addition to the center-buckling and edge-buckling shapes equivalent to the tension distribution of FIG. 9.

Further, even in this preferred embodiment, similar to the preferred embodiment shown in FIG. 6, it is preferable to carry out the various calculations and to display the strip shape using a computer.

Further, in the preferred embodiments described so far, examples have been given of approximating the tension distribution of the strip using a second order function in the plate width direction with two or three unknown coefficients. However, it is possible to carry out this approximation using a function in the plate width direction that has more number of unknown coefficients, to measure any of the parameters of supporting reaction force, supporting moment, amount of roller deflection, roller deflection angle, and roller bending stress, with the number of parameters being equal to the number of unknown coefficients, to prepare condition equations with their number being same as the number of unknown parameters, to solve these equations as simultaneous equations and determining said unknown coefficients and calculating the tension distribution, and to convert that tension distribution into the strip shape of the strip. The detection accuracy increases as the number of unknown coefficients is increased.

Figure 10:
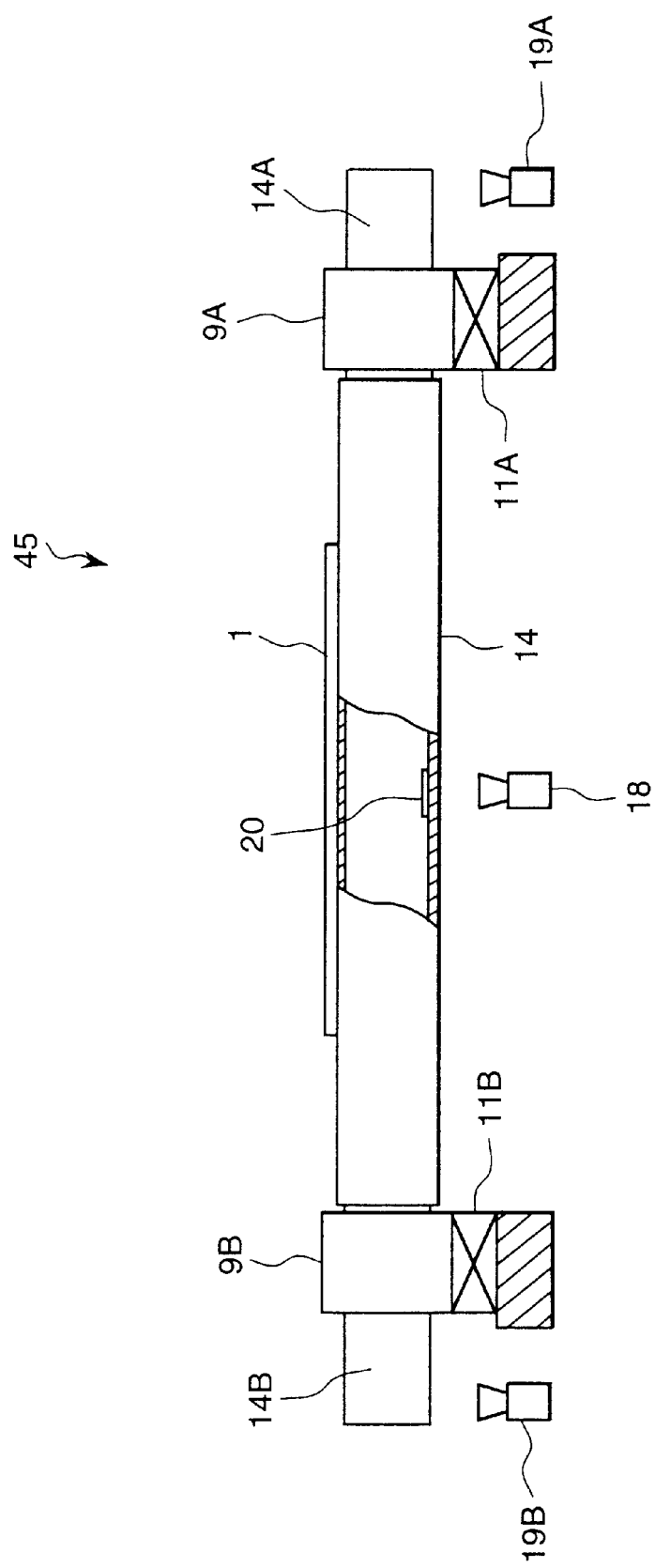
FIG. 10 is a side view of the shape detection equipment according to the fifth preferred embodiment of the present invention similar to FIG. 2.

The preferred embodiment in this case is described as a fifth preferred embodiment of the present invention using FIG. 10.

In FIG. 10, the shape detection equipment pertaining to the present preferred embodiment has a shape detecting device 45, and this shape detecting device 45 has bearing boxes 9A and 9B on the operation side end part and driving side end part of the roller 14 with one on one side or two on both sides, and has load cells 11A and 11B corresponding to these bearing boxes with one on one side or two on both sides. In addition, there is a gap sensor 18 provided on the lower side of the mid-point of the roller 14, and the deflection of the mid-point of the roller 14 is detected by this gap sensor 18. Further, extended roller shaft parts 14A and 14B have been provided at both ends of the roller 14 that project beyond the bearing boxes 9A and 9B by a specific length, gap sensors 19A and 19B are provided on the lower side of these extended roller shaft parts 14A and 14B, and the deflection angles of the two ends of the roller 14 are measured by detecting the amount of deflection of the end parts of the extended roller shaft parts 14A and 14B using these gap sensors 19A and 19B. Further, the roller 14 is made hollow, and a distortion gauge 20 is installed on the inside wall at the mid-point of this hollow roller using which the bending stress at the mid-point of the roller. The status values with their number being equal to the number of unknown coefficients is are measured using these sensors, and by preparing condition equations with their number being same as the number of unknown parameters, it is possible to calculate the strip shape of the strip with a high accuracy as has been explained above.

A sixth preferred embodiment of the present invention is described below using FIG. 11.

Figure 11:
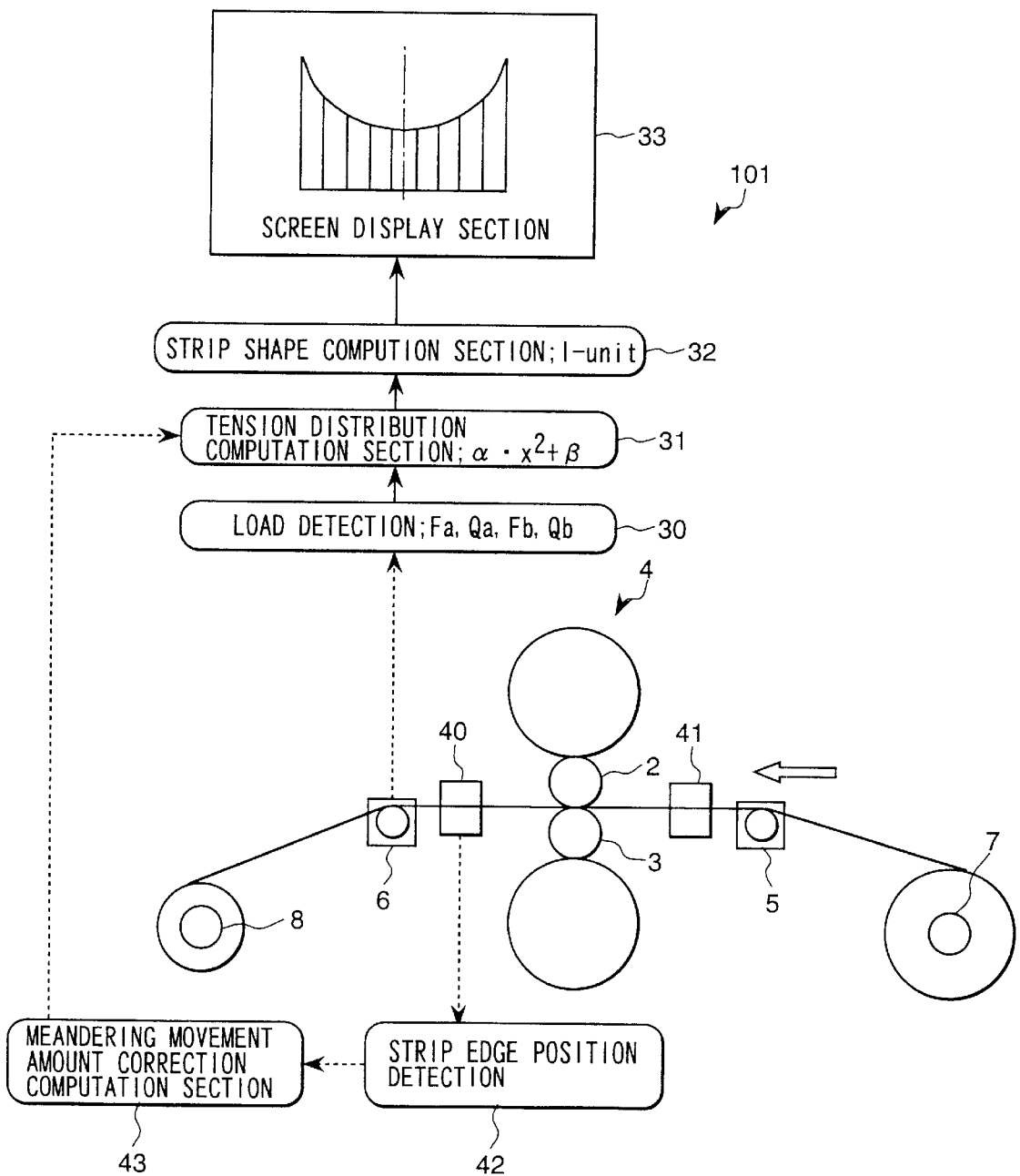
FIG. 11 is a view showing the rolling mill facility with strip shape detection equipment according to the sixth preferred embodiment of the present invention using some functional blocks.

In FIG. 11, the shape detection equipment pertaining to the present preferred embodiment is provided with plate edge position detectors 40 and 41 for detecting the amount of meandering movement of the strip, a computer 101, with the computer 101 having a plate edge position detection section 42 and a meandering movement amount correction computation section 43 in addition to a load detection section 30, a tension distribution computation section 31, a strip shape computation section 32, and a screen display section 33. The plate edge position detection section 42 takes as inputs the detection signals from the plate edge position detectors 40 and 41 and computes the amount of meandering movement δ, and the meandering movement amount correction computation section 43 changes the values of the dimensions A and B in FIG. 5 as follows according to the value of this amount of meandering movement δ.

$A$=Plate width/2−δ

$B$=Plate width/2+δ

The result of computation in the meandering movement amount correction computation section 43 is sent to the tension distribution computation section 31 and will be processed there in a manner similar to that in the preferred embodiment shown in FIG. 6.

According to the present preferred embodiment, even when meandering movement of the plate is present, it is possible to correct for this and detect the shape.

A seventh preferred embodiment of the present invention is described below using FIG. 12.

Figure 12:
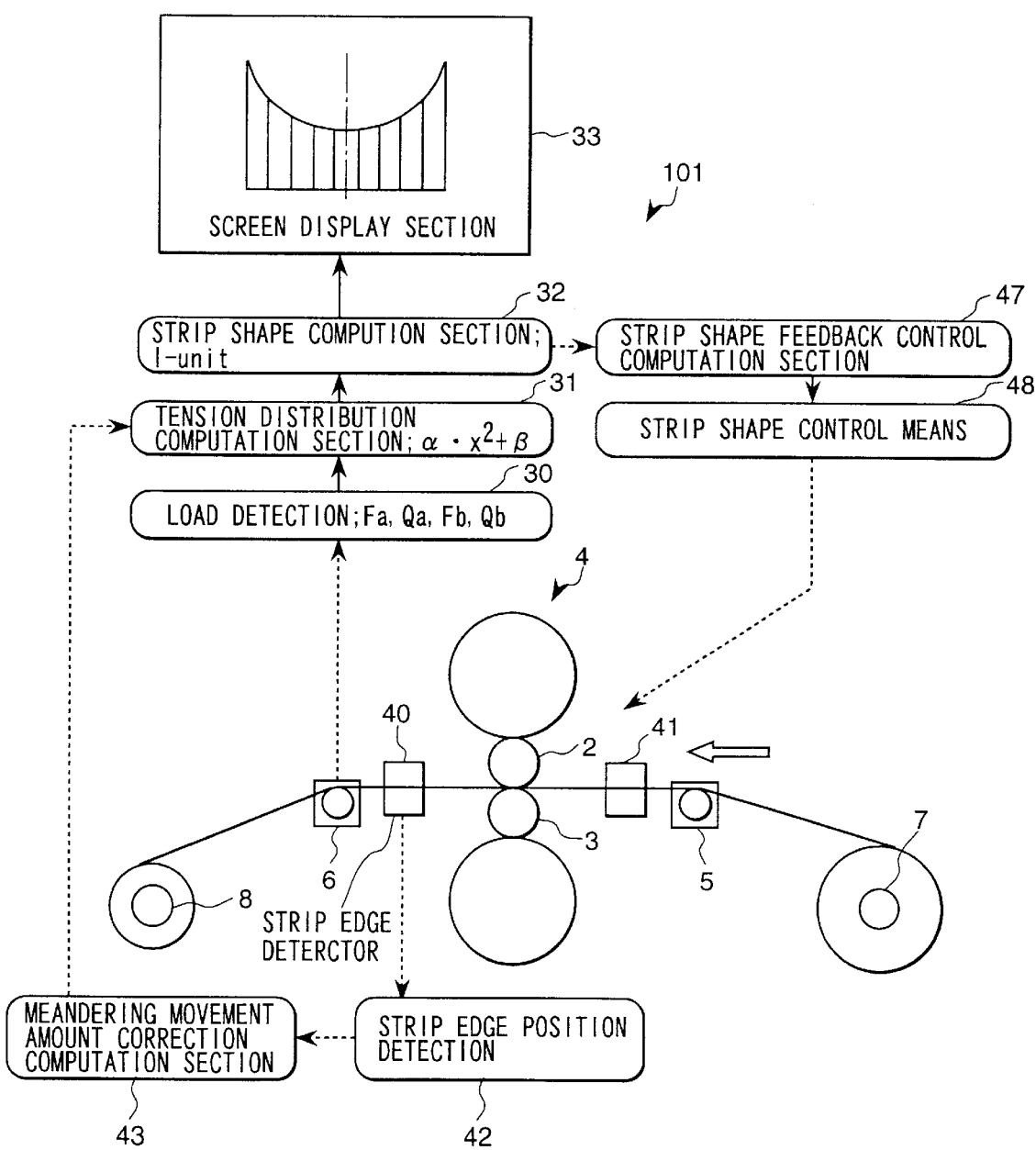
FIG. 12 is a view showing the rolling mill facility with strip shape detection equipment according to the seventh preferred embodiment of the present invention using some functional blocks.

In FIG. 12, the present preferred embodiment is provided additionally with a strip shape feedback control computation section 47 and a strip shape control means 48, the strip shape feedback control computation section 47 carries out feedback control of the strip shape control means 48 of the rolling mill 4 so that the difference between the strip shape computed by the strip shape computation section 32 and the target strip shape that has been input beforehand becomes small.

According to the present preferred embodiment, by carrying out feedback control of the strip shape control means 48 of the rolling mill 4, it will be possible to increase the acceleration rate at the time of starting the rolling operation, and also to increase the production efficiency because the frequency of strip exhaustion gets decreased.

Further, although in the above preferred embodiments, examples have been given with the rolling mill being a single stand, it is possible to have several stands of rolling mills in tandem and to install this shape detector on the outlet side of each rolling mill. In that case, since the shape is measured in each stand, it is possible to carry out shape control in each stand, thereby making it possible to obtain strip s with superior strip shapes. In addition, even in this case, it is possible to increase the acceleration rate by carrying out feedback control of the shape control means of the rolling mill of each stand so that the difference between the measured shape and the target shape becomes small, and also the production efficiency becomes higher because the frequency of plate being exhausted between the different stands becomes smaller.

Further, since this shape detector can calculate the tension of the strip by the load difference at the supporting point, it can also be used simultaneously as a tension measuring instrument. In this case, in FIG. 4, the tension T of the strip is given by the following equation when the winding angle of the strip is taken as θ.

$T=((Fa-Qa)+(Fb-Qb))/(2 \cdot \sin(\theta/2))$

According to the present invention, it is possible to measure easily the strip shape of metal strip s after rolling using a simple construction. Furthermore, as a result of this, since it is possible to carry out strip shape control in the rolling mill, it becomes possible to obtain strip s with superior strip shapes, and also the also the production efficiency becomes higher because the frequency of plate being exhausted becomes smaller.

In addition, since the roller is a non-segmented integrated construction roller, there is no problem of causing scratches on the surface of the strip, and also there are no bad effects of thermal deformation due to heat transfer from the strip, and hence the durability gets improved.

What is claimed is:

1. A rolling mill facility comprising at least one rolling mill having a pair of, top and bottom, work rolls that roll strips, and strip shape detection equipment in which a strip shape detecting device is installed on at least one of inlet and outlet sides of said rolling mill, said strip shape detecting device comprising, one roller on which the strip gets wound, at least two bearing boxes on one side or four bearing boxes on both sides of said roller, said bearing boxes being provided on an operating side end section and a driving side end section and supporting said roller in a free-to-rotate manner, at least two load cells on one side or four load cells on both sides, provided on said bearing boxes, respectively, and measuring supporting loads on each of said bearing boxes, and a means provided on said load cell on any one of said two bearing boxes on each side for applying a pre-load on said load cell in a direction of the supporting load.

2. The rolling mill facility of claim 1 wherein said means for applying a pre-load includes a plate disposed against said load cell and a bolt engageable with said plate.

3. A rolling mill facility comprising at least one rolling mill having a pair of, top and bottom, work rolls that roll strips, and strip shape detection equipment in which a strip shape detecting device is installed on at least one of inlet and outlet sides of said rolling mill, said strip shape detecting device comprising, one roller on which the strip gets wound, at least two bearing boxes on one side or four bearing boxes on both sides of said roller, said bearing boxes being provided on an operating side end section and a driving side end section and supporting said roller in a free-to-rotate manner, at least two load cells on one side or four load cells on both sides, provided on said bearing boxes, respectively, and measuring supporting loads on each of said bearing boxes, and said strip shape detection equipment comprising, an edge position detecting device that detects an amount of meandering movement of the strip, and a means for calculating an operating side plate width range and a driving side plate width range according to values detected by said edge position detecting device, and converting to a strip shape in the plate width range of the strip on the operating side from loads measured by said two load cells provided on said bearing boxes in the operating side end section of said strip shape detecting device, and to a strip shape in the plate width range of the strip on the driving side from loads measured by said two load cells provided on said bearing boxes in the driving side end section of said strip shape detecting device.

4. The rolling mill facility of claim 3 wherein said edge position detecting device includes a first and a second plate edge position detector wherein said first and second plate edge position detectors are disposed on the strip and said first plate edge position detector is installed on the inlet side of said rolling mill and said second plate edge position detector is installed on the outlet side of said rolling mill.

5. A rolling mill facility comprising at least one rolling mill having a pair of, top and bottom, work rolls that roll strips, and strip shape detection equipment in which a strip shape detecting device is installed on at least one of inlet and outlet sides of said rolling mill, said strip shape detecting device comprising, one roller on which the strip gets wound, at least two bearing boxes on one side or four bearing boxes on both sides of said roller, said bearing boxes being provided on an operating side end section and a driving side end section and supporting said roller in a free-to-rotate manner, at least two load cells on one side or four load cells on both sides, provided on said bearing boxes, respectively, and measuring supporting loads on each of said bearing boxes, and said strip shape detection equipment comprising, a displacement measurement means that measures a roller surface displacement in a tension supporting direction at at least one location of said strip shape detecting device, and a means for calculating a tension distribution of the strip from the loads measured by said load cells of said strip shape detecting device and the values measured by said displacement measurement means, and converting the tension distribution into a strip shape of the strip.

6. A rolling mill facility according to claim 5, further comprising a control means for carrying out feedback control of a shape controlling means provided for said rolling mill so that a difference between a shape measured by said strip shape detecting device on the outlet side of said rolling mill and a previously set target strip shape becomes small.

7. The rolling mill facility of claim 5 wherein said displacement measurement means includes a gap sensor provided on a lower side of a midpoint of the roller.

* * * * *